No. 648,913. H. L. BENTLEY. Patented May 8, 1900.
MAP.
(Application filed Sept. 21, 1899.)
(No Model.)
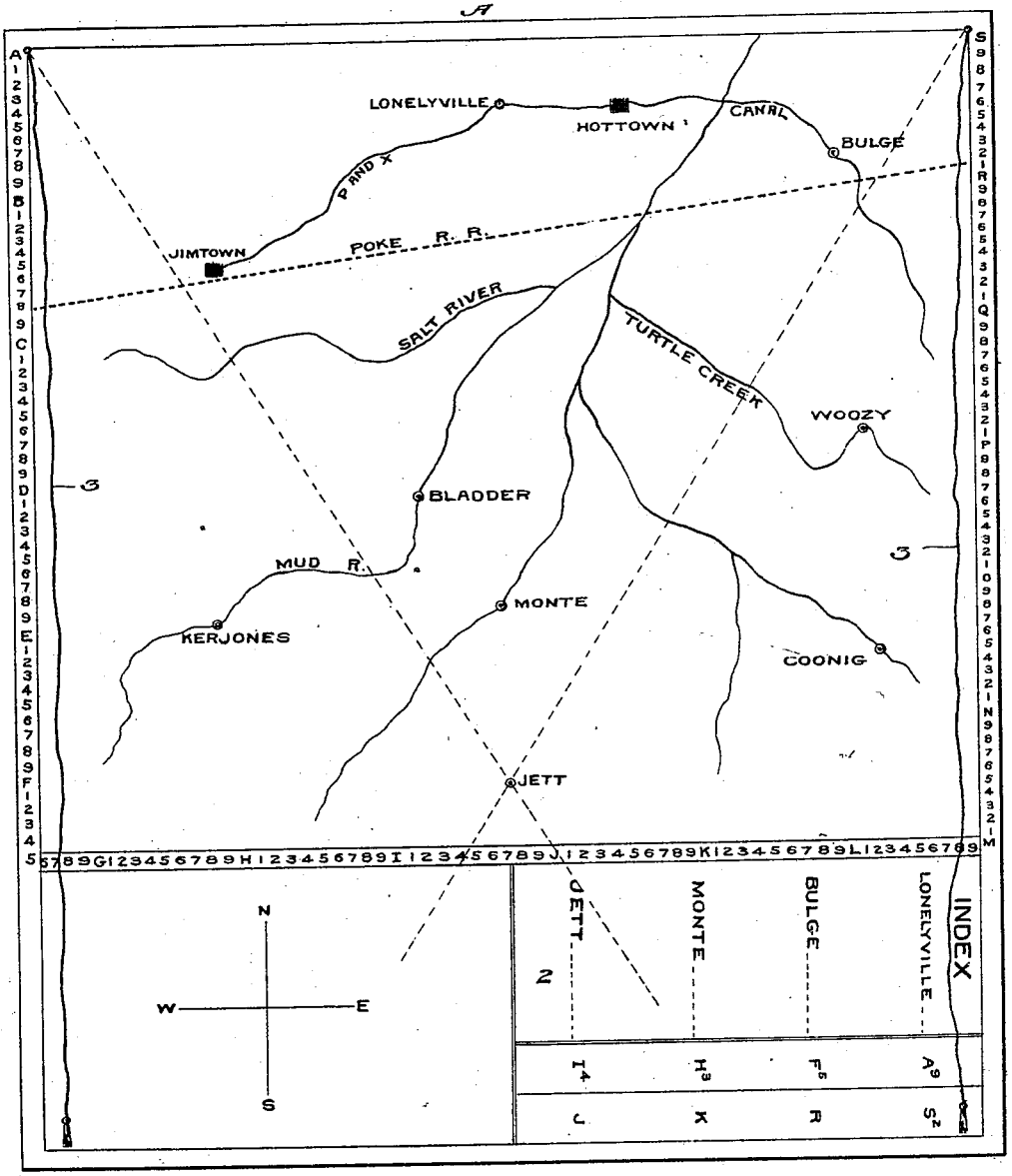

UNITED STATES PATENT OFFICE.

HENRY LEWIS BENTLEY, OF ABILENE, TEXAS.

MAP.

SPECIFICATION forming part of Letters Patent No. 648,913, dated May 8, 1900.

Application filed September 21, 1899. Serial No. 731,212. (No model.)

*To all whom it may concern:*

Be it known that I, HENRY LEWIS BENTLEY, a citizen of the United States, residing at Abilene, in the county of Taylor and State of Texas, have invented certain new and useful Improvements in Maps; and I do declare the following to be a full, clear, and exact description of the invention, such as will enable others skilled in the art to which it appertains to make and use the same.

The invention relates to maps.

The object of the invention is to provide a simple and convenient system by which names and localities on maps, drawings, and analogous articles can be readily and accurately ascertained.

To this end the invention consists in printing, placing, or pasting upon or near the edges of the map, drawing, &c., a number of distinguishing-marks, such as numerals or letters, together with an index of the localities on the map with corresponding distinguishing-marks, and providing the map with two indicators, which are preferably in the form of cords or tapes, which when moved to the distinguishing-marks will indicate at their point of crossing or intersection the place desired to be located.

Referring to the accompanying drawings, in which I have represented my invention in plan, A denotes the map, having along its sides and lower edge distinguishing-marks which may be in the form of regularly-progressing numerals, the alphabet, or, in fact, any sign or symbol. In the present instance I have shown numerals arranged in rows progressing from "1" to "9," each row being separated by a letter of the alphabet.

Arranged at a convenient place on the map is an index 2. This index comprises the names of all the places on the map and is provided with two columns of distinguishing characters, one marked "R" and the other "L," designating right and left hand.

3 denotes cords or tapes, in the present instance shown as two in number, one secured to the upper right-hand corner of the map and the other to the upper left-hand corner.

Assuming that it be desired to locate the town of Jett, the index is consulted, and it is observed that the right-hand cord is to be moved to the distinguishing character $I^4$ and the left-hand cord to the distinguishing character J. In dotted lines I have shown these cords moved to these points, and it will be observed that at the place of crossing or intersection will be found the place named "Jett."

Where it is desired to apply the invention to maps now in use, strips containing distinguishing characters may be attached to the maps, and an index may be printed and also attached to the maps. It is therefore evident that my invention is not limited to a map with indexes and distinguishing characters printed thereon, as the same may be readily applied by pasting strips properly lettered or numbered to the map and also pasting thereto indexes.

Having thus described the invention, what is claimed, and desired to be secured by Letters Patent, is—

As a new article of manufacture, a map, drawing or similar device provided with an index with the names of places or localities designated thereon, each name of a place in the index being accompanied by two distinguishing characters, rows of distinguishing-numbers arranged along the edge or edges of the map or drawing or similar device, and an indicator secured to each upper right and left hand corner of the map and adapted to be crossed and indicate at their point of crossing the place desired to be located, substantially as and for the purpose set forth.

In testimony whereof I have hereunto set my hand in presence of two subscribing witnesses.

HENRY LEWIS BENTLEY.

Witnesses:
 J. P. DANIEL,
 J. E. ROBINSON.